May 21, 1946.　　　F. H. ALCOTT　　　2,400,865
TIMBER RING CONNECTOR
Filed May 24, 1944
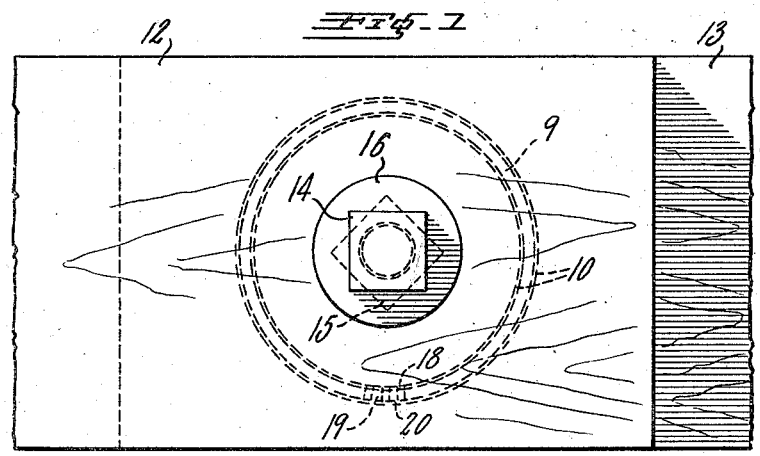
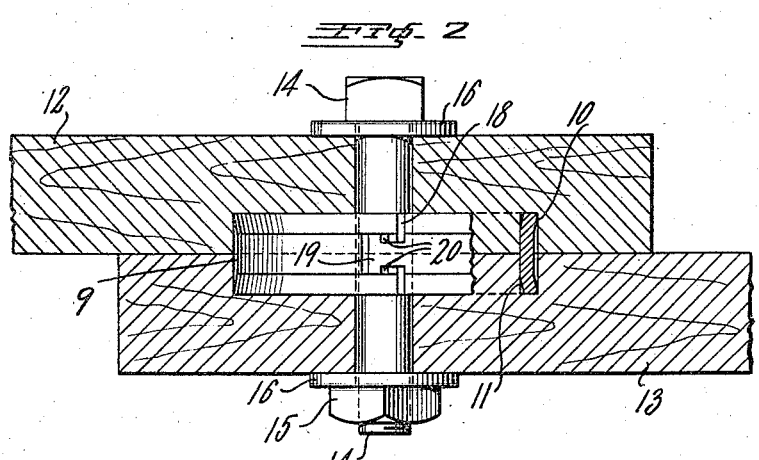
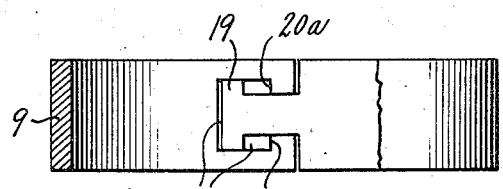
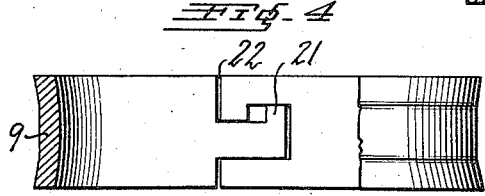
INVENTOR.
FRANK H. ALCOTT
BY
ATTORNEY Patented May 21, 1946

2,400,865

UNITED STATES PATENT OFFICE 2,400,865

TIMBER RING CONNECTOR

Frank H. Alcott, Jamaica, N. Y., assignor to Palisade Structures, Inc., New York, N. Y., a corporation of New York Application May 24, 1944, Serial No. 537,067

2 Claims. (Cl. 20—92)

The invention relates to metal connectors of high tensile strength for timber bonding and more particularly to connectors of this character that are of the split band or discontinuous ring type.

Split ring connectors are well known in the art. They are generally circular open rings of metal and sometimes have a tongue and slot arrangement slidably engaging the ends of the split ring. Such devices are employed in the contact faces of lapped timber members to transfer a load from one member to the other. A circular groove is cut into each of the contact faces of the lapped members, the two grooves registering in such manner that half of the ring is installed in each contact face. The circular grooves are preferably cut so that the core embraced within the inside circumference of the groove is of slightly larger diameter than the inside diameter of the ring and, when the ring is driven into the groove, it expands accordingly. The expansion is, however, mechanically unrestrained and the ring, even when fitted with tongue and groove, may open either under the stresses exerted in originally installing the ring, or, later, under the stresses encountered during use.

A split ring connector of the type just described cannot be relied on with certainty of safe transmission of forces of great magnitude. Due to the lack of restraint on the expansion of the ring, the load tends to increase the diameter of the ring elliptically and thus to exert a crushing effect upon the wooden core within the ring. The expanding force upon the ring under load furthermore tends to cause distortion and consequently exerts an upsetting or tipping action at the ring joint thereby causing dangerous stresses in the bolt. These disadvantages, singly or in combination, result in "initial set" or slip and produce deformations under load which may be cumulative, which are variable, and which are not necessarily proportionate to the loads imposed.

Accordingly, it is the object of the present invention to provide a connector which will reduce or avoid entirely these disadvantages. It is a further object of the invention to reduce the cost of timber connected framing by the use of more efficient bonds which will warrant the use of higher working stresses with safety.

It is a further object of the invention to provide such connectors as will effect a tighter registry of the ring connector with the receiving grooves in the corresponding meeting faces of juxtaposed timbers when they are drawn together.

It is a further object of the invention to provide a severed annular metal connector uniform in section having slidably engaging expansible means that permit only a measured peripheral expansion against tensed increase of diameter.

Briefly, the invention may be described as a metal connector for timber bonding that is of the split band or discontinuous ring type, that embodies a lock joint set in the ends permitting a certain predetermined degree of expansion and that prevents expansion beyond that point. Such a ring connector will readily enter the enlarged grooves, yet when it is driven home tightly it will grip the core wall in tensed expanded relation. By additionally giving the ring a profile in accordance with my copending application simultaneously filed herewith, the capacity for transferring stress from one member to another is greatly increased, since the ring then engages not only the wooden core within the groove but also the external wall of the groove at the rims.

The invention will be more clearly understood from the drawing in which Fig. 1 is a plan view of a bonded pair of juxtaposed planks employing one form of ring connector of the invention; Fig. 2 is a view through the structure of Fig. 1 with the ring connector shown partly in full line and partly in section; Figs. 3 and 4 are sectional details of different possible forms of rings of the invention.

In Figs. 1 and 2 the numeral 9 indicates a metal ring connector in place within annular grooves 10 and 11 of rectangular cross section. These grooves have been tooled into the meeting faces of planks 12 and 13 in registry with each other. They are dapped to equal depths in the respective planks 12 and 13 so that each groove will accommodate one-half of the ring 9. The planks 12 and 13 are further bonded together by the aligning bolt 14, the nut 15 and the heavy washers 16. The cores within the grooves 10 and 11 are of slightly larger diameter than the least inside diameter of ring 9 so that when the ring 9 is driven into place within the grooves it is forced into expanded, tensed position so as to assure normal pressure on the cores. The clearance 18 of the lock joint in the ring 9 is the measure of the amount the ring may expand when it is seated in the grooves 10 and 11 and this clearance must be sufficient to allow for anticipated shrinkage of the lumber if it has not been previously thoroughly seasoned.

This lock joint is made up of the tongue element 19 in one end of the split ring 9 and the slot element 20 in the other end. It will be seen more clearly from Fig. 3 that each of elements 19 and 20 is provided with shoulders or projections that coact to check the lateral movement of the ends of the ring 9 when it is under expansive forces, thus preventing the tongue element 19 from being forced out of the slot element 20. By means of this lock joint that permits a desired degree of expansion, and at the same time prevents expansion to an undesired degree, the lack of accommodation characteristic of solid or closed ring connectors is obviated and the elliptical distortion and tipping common to split ring connectors heretofore used is minimized. More uniform distribution of stress from wood to ring and from ring to wood is thus secured. The tendency to shear off the core under higher loadings is thus reduced.

In Fig. 3 the lock joint of ring 9 is shown with a tongue element 19 T-shaped and a slot element 20 provided with shoulders 20ª that restrain or check the movement of tongue element 19 by bearing against the arms of the latter when and if stresses are exerted great enough to expand the ring that far.

Fig. 4 shows another form of the lock joint operating on the same principle, the tongue element 21, however, having only one arm while the slot element 22 has but one coacting shoulder.

It will be seen that the ring of the invention, while being expansible, is restrained as to the degree of expansion and that movement tending to distort or tip up the ring is also restrained. This restraint is effected by the coaction of the checking elements of the lock joint, the arms of the tongue element 19 and the shoulders of the slot element 20.

While I have described the invention with reference to the joining of heavy planks and timbers, it will be obvious that the restrained ring of the invention is applicable to joints in furniture, shipbuilding and, in fact, in any work of such nature that dowels of other types may be used.

Having thus described my invention, what I claim is:

1. A timber connector comprising a substantially circular split spring ring of high tensile strength and of continuous uniform section, tensed to minimum diameter to automatically close in engagement with the cores of grooves in the timbers in which it may be seated and said ring having tongue and groove elements at the ends of the same concentric with the balance of the ring and provided with mating shoulders at right angles to the direction of expansion of the ring, said shoulders being spaced in the tensed closing condition of the ring but arranged to engage in expansion of the ring to positively limit and predetermine the expansive movement of the ring.

2. A timber connector comprising a substantially circular split spring ring of high tensile strength and of continuous uniform section, tensed to minimum diameter to automatically close in engagement with the cores of grooves in the timbers in which it may be seated and said ring having tongue and groove elements at the ends of the same concentric with the balance of the ring and provided with mating shoulders at right angles to the direction of expansion of the ring, said shoulders being spaced in the tensed closing condition of the ring but arranged to engage in expansion of the ring to positively limit and predetermine the expansive movement of the ring, said expansion limiting tongue and groove elements being located in the intermediate portion of the ring between the rims of the same and said intermediate portion being of less external diameter than the rim portions of the ring and thereby locating said tongue and groove elements inset from the maximum diameter portions of the ring.

FRANK H. ALCOTT.